(12) United States Patent
Patel et al.

(10) Patent No.: US 7,022,171 B2
(45) Date of Patent: Apr. 4, 2006

(54) PHTHALOCYANINE COMPOUNDS AND INK COMPOSITIONS COMPRISING THE SAME

(75) Inventors: Prakash Patel, Manchester (GB); Tina Margaret Horrobin, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/510,814

(22) PCT Filed: Feb. 27, 2003

(86) PCT No.: PCT/GB03/00808

§ 371 (c)(1),
(2), (4) Date: Oct. 12, 2004

(87) PCT Pub. No.: WO03/089532

PCT Pub. Date: Oct. 30, 2003

(65) Prior Publication Data

US 2005/0126436 A1    Jun. 16, 2005

(30) Foreign Application Priority Data

Apr. 18, 2002   (GB) .................................. 0208865

(51) Int. Cl.
*C09D 11/02*      (2006.01)
*C09B 47/04*      (2006.01)

(52) U.S. Cl. .............. 106/31.49; 106/31.78; 540/132; 540/133; 540/128

(58) Field of Classification Search ............ 106/31.49, 106/31.78; 540/128, 130, 132, 133; 347/100; 427/466; 428/195.1
See application file for complete search history.

(56) References Cited

U.S. PATENT DOCUMENTS

| | | | | |
|---|---|---|---|---|
| 5,123,960 A | * | 6/1992 | Shirota et al. ............ | 106/31.46 |
| 5,296,023 A | * | 3/1994 | Gregory et al. .......... | 106/31.46 |
| 5,980,623 A | | 11/1999 | Hiraoka et al. .......... | 106/31.49 |
| 6,149,722 A | | 11/2000 | Robertson et al. ....... | 106/31.49 |
| 6,221,114 B1 | | 4/2001 | Wurthner et al. ........ | 8/661 |
| 6,235,097 B1 | | 5/2001 | Kenworthy et al. ..... | 106/31.49 |
| 6,454,845 B1 | * | 9/2002 | Shawcross et al. ...... | 106/31.49 |
| 2005/0081748 A1 | * | 4/2005 | Patel ....................... | 106/31.49 |

FOREIGN PATENT DOCUMENTS

| | | |
|---|---|---|
| EP | 0559309 | 1/1993 |
| JP | 08 295819 | 11/1996 |
| WO | WO 00/08103 | 2/2000 |

* cited by examiner

*Primary Examiner*—Helene Klemanski
(74) *Attorney, Agent, or Firm*—Morgan, Lewis & Bockius

(57) ABSTRACT

A process for coloration of a substrate comprising applying thereto by means of an ink-jet printer an ink composition comprising a compound of Formula (1) or salt thereof: wherein: M is 2H, Si, a metal, an oxymetal group, a hydroxymetal group or a halometal group; Pc is a phthalocyanine nucleus of Formula (2); each $R^1$ and $R^2$ independetly are H, $C_{1-4}$alkyl or $C_{1-4}$hydroxyalkyl; $R^3$ is phenyl carrying 1 or 2 sulpho substituents or phenyl carrying at least 1 carboxy or 1 phosphato substituent and having further optional substituents; x, y and z are all greater than 0 and the sum of (x+y+z) is 2 to 5. Also novel compounds, compositions, printed substrates and ink-jet printer cartridges

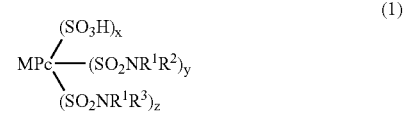

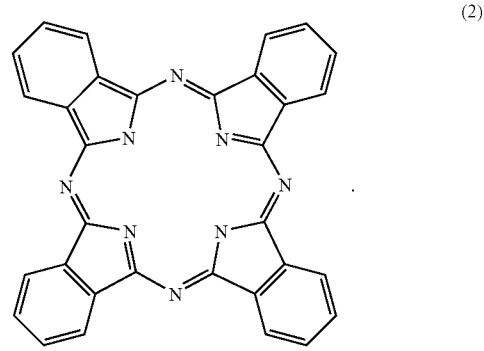

11 Claims, No Drawings

PHTHALOCYANINE COMPOUNDS AND INK COMPOSITIONS COMPRISING THE SAME

This invention relates to compounds, to compositions containing these compounds, to inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate.

There are many demanding performance requirements for dyes and inks used in ink-jet printing. For example they desirably provide sharp, non-feathered images having good water light and ozone-fastness and optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate that could block the fine nozzle.

Copper phthalocyanine dyes such as C.I. Direct Blue 199 and C.I. Direct Blue 86, are widely used as colorants in commercial ink-jet printing inks. Other phthalocyanine dyes have also been developed for ink-jet printing such as those in U.S. Pat. No. 5,296,023 which describes copper phthalocyanine dyes having sulpho and carboxyphenyl-substituted sulphonamide groups.

With the advent of high-resolution digital cameras it is increasingly common to print off photographs using an ink-jet printer. This avoids the expense of conventional silver halide photography and provides an instant print for the consumer.

The problem of providing an acceptable "photographic quality" ink-jet print presents demanding technical challenge for colourants and inks, in particular with respect to colour-fastness, because photographic quality prints are often kept for many years. It has been found that a key factor in the poor colour-fastness of ink-jet prints is the colorants in the print reacting with oxidising gases, such as ozone, naturally present in the atmosphere.

This invention relates to processes and colorants suitable for use in ink-jet printing able to provide prints with high colour-fastness and ozone-fastness.

According to the present invention there is provided a process for coloration of a substrate comprising applying thereto by means of an ink-jet printer an ink composition comprising a compound of Formula (1) or salt thereof:

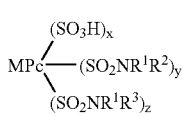

Formula (1)

wherein:
M is 2H, Si, a metal, an oxymetal group, a hydroxymetal group or a halometal group;

Pc is a phthalocyanine nucleus of Formula (2);

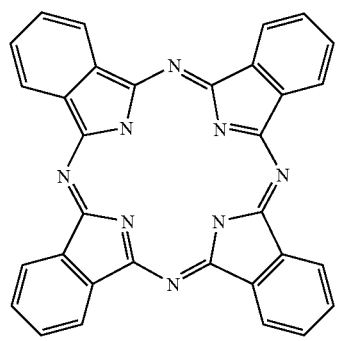

Formula (2)

each $R^1$ and $R^2$ independently are H, $C_{1-4}$alkyl or $C_{1-4}$hydroxyalkyl;

$R^3$ is phenyl carrying 1 or 2 sulpho substituents or phenyl carrying at least 1 carboxy or 1 phosphato substituent and having further optional substituents;

x, y and z are all greater than 0 and the sum of (x+y+z) is 2 to 5.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or $SiX_2$, where in X is OH or Cl, more preferably Sc, Ti, Va, Cr, Mn, Fe, Co, Zn, Ni and Cu, especially Cu or Ni.

Preferably $R^1$ and $R^2$ independently are H or methyl, more preferably $R^1$ and $R^2$ are H.

Preferred further optional substituents which may be present on $R^3$ are selected from alkyl, more preferably $C_{1-4}$-alkyl; alkoxy, more preferably $C_{1-4}$-alkoxy; polyalkylene oxide; nitro; cyano; sulpho; halo, especially bromo, chloro or fluoro; ureido; $SO_2F$; hydroxy; ester, more preferably —$CO_2(C_{1-4}$-alkyl); —$NR^4R^5$; —$COR^4$; —$CONR^4R^5$ and —$SO_2NR^4R^5$ wherein $R^4$ and $R^5$ are each independently H or alkyl, preferably H or $C_{1-4}$-alkyl.

Preferably $R^3$ is phenyl carrying a single carboxy or sulpho substituent, more preferably $R^3$ is phenyl carrying a single carboxy substituent. It is especially preferred that $R^3$ is 3-carboxy phenyl. Preferably x is 0.2 to 3.8, more preferably 0.5 to 3.5 and especially 1 to 3.

Preferably y is 0.2 to 3.8, more preferably 0.5 to 3.5 and especially 1 to 3.

Preferably z is 0.2 to 3.8, more preferably 0.5 to 3.5 and especially 1 to 3.

The sum of (x+y+z) is preferably 2 to 4, more preferably 3 to 4.

Acid or basic groups on the compounds of Formula (1), particularly acid groups, are preferably in the form of a salt. Thus, the Formulae shown herein include the compounds in free acid and salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. The compounds may be converted to the salt form using known techniques.

The compounds of Formula (1) may exist in tautomeric forms other than those shown in this specification. These tautomers are included within the scope of the present invention.

The compounds of Formula (1) have attractive, strong cyan shades and are valuable colorants for use in the preparation of ink-jet printing inks. They benefit from a good balance of solubility, storage stability and fastness to water and light. In particular they display excellent colour-fastness, especially ozone-fastness. Furthermore they may be prepared from inexpensive intermediates, avoiding the complexity and expense that is involved in manufacturing some of the more elaborate phthalocyanines.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electro-mechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain, coated or treated papers which may have an acid, alkaline or neutral character.

According to a second aspect of the present invention there is provided a compound of Formula (1) or salt thereof as hereinbefore defined with the proviso that $R^3$ is not of Formula (3), Formula (4) or (5) or a salt thereof:

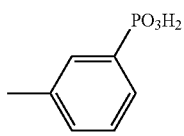

Formula (3)

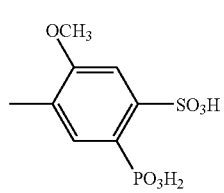

Formula (4)

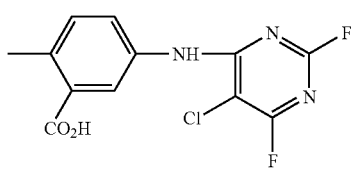

Formula (5)

Preferences for compounds of Formula (1) are as described above in relation to the first aspect of the invention.

A particularly preferred compound of Formula (1) is of Formula (6) or a salt thereof:

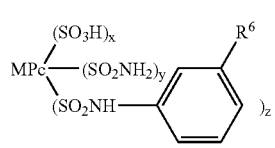

Formula (6)

wherein:
  M is 2H, Cu or Ni;
  Pc is a phthalocyanine nucleus of Formula (2);
  $R^6$ is sulpho or carboxy; and
  x, y and z are all greater than 0 and the sum of (x+y+z) is 2 to 4.
  In an especially preferred compound of Formula (6) $R^6$ is carboxy.

According to a third aspect of the present invention there is provided a composition comprising a compound according to the second aspect of the invention (preferably of Formula (6)) and a liquid medium.

Preferred compositions comprise:
  (a) from 0.01 to 30 parts of a compound according to the second aspect of the invention, preferably of Formula (6); and
  (b) from 70 to 99.99 parts of a liquid medium;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

Preferred liquid media include water, a mixture of water and organic solvent and organic solvent free from water.

When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, espedally from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected that gives good control over the drying characteristics and storage stability.

Liquid media comprising an organic solvent free from water are particularly useful where fast drying times are required and particularly when printing onto hydrophobic and non-absorbent substrates, for example plastics, metal and glass.

The liquid medium may also contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the composition to modify shade and performance properties. Examples of such colorants include C.I.Direct Yellow 86, 132, 142 and 173; C.I.Direct Blue 86, 199, and 307; C.I.Food Black 2; C.I.Direct Black 168 and 195; C.I.Acid Yellow 23; and any of the dyes used in ink-jet printers sold by Seiko Epson Corporation, Hewlett Packard Company, Canon Inc. & Lexmark International. Addition of such further dyes can increase overall solubility leading to less kogation (nozzle blockage) for the resultant ink.

It is preferred that a composition according to the third aspect of the invention is an ink or liquid dye concentrate.

It is especially preferred that the composition according to the third aspect of the invention is an ink suitable for use in an ink-jet printer.

Thus, preferably the composition has a viscosity of less than 20 cP, more preferably less than 10 cP, especially less than 5 cP, at 25° C. These low viscosity compositions are particularly well suited for application to substrates by means of ink-jet printers.

Preferably the composition contains less than 500 ppm, more preferably less than 250 ppm, especially less than 100 pm, more especially less than 10 ppm in total of divalent and trivalent metal ions (other than any divalent and trivalent metal ions bound to a component of the ink).

Preferably the composition has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably the composition contains less than 500 ppm, more preferably less than 250 ppm, especially less than 100 pm, more especially less than 10 ppm in total of halide ions.

A fourth aspect of the present invention provides a substrate printed with a composition according to the third aspect of the invention, a compound according to the second aspect of the invention or by means of a process according to first aspect of the invention. Preferably the substrate is paper, plastic, a textile, metal or glass, more preferably paper, an overhead projector slide or a textile material, especially paper more especially plain, coated or treated papers A fifth aspect of the present invention provides an ink-jet printer cartridge comprising a chamber and an ink wherein the ink is in the chamber and the ink is as defined in the third aspect of the present invention.

The invention is further illustrated by the following Examples in which all parts and percentages are by weight unless otherwise stated.

EXAMPLE 1

Preparation of:

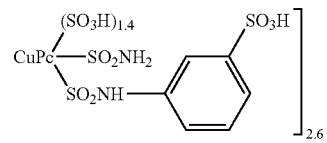

Stage 1

Chlorosulphonic acid (38 ml, 0.57 mole) was charged to a 250 ml 4-necked round bottomed flask. $POCl_3$ (5.3 ml, 0.057 mole) was then added dropwise with continuous mixing over 10–15 minutes while maintaining the temperature below 30° C. This reaction mixture was then stirred for a further 10 minutes. Copper phthalocyanine (14.4 g, 0.025 mole) was added in small portions, with stirring, over approximately 45 minutes while maintaining the temperature below 55° C. The reaction mixture was stirred for a further 45 minutes and then warmed to 140±2° C. over the course of approximately 20 minutes. The reaction mixture was held at this temperature for 4 hours with stirring and was then cooled to room temperature and left to stand overnight.

The next morning the reaction mixture was drowned out into ice/water/salt/cHCl (ratio 350 g/150 ml/12.5 g/3.5 ml) whilst maintaining the temperature below 0° C.

The precipitate was collected by filtration and washed with an ice cold saturated brine solution (300 ml).

Stage II
Preparation of the Title Product

3-Sulphoaniline (4.46 g, 0.025 mole) was added to a flask containing water (200 ml) and ice (100 g) mixture at 0 to 5° C. The product obtained from stage I was added to the flask and the pH was adjusted to the range of pH 7.8 to 8 using a 10% ammonia solution. The reaction mixture was stirred at 0 to 5° C. for 3¾ hours maintaining the pH at pH 7.8 to 8 by further additions of a 10% ammonia solution. The reaction mixture was then warmed to 40±2° C. over 45 minutes and held at this temperature for a further 2 hours. The mixture was then allowed to cool to room temperature overnight.

The next morning the pH of the mixture was adjusted to pH 2 using concentrated hydrochloric acid HCl and 20% NaCl w/v (150 g) was added. The resultant precipitate was collected by filtration and washed with saturated brine (250 ml). The resultant paste was dissolved in water (800 ml) and the pH adjusted to pH 9 to 9.5 to give a solution. The solution was dialysed with several changes of water over the course of 2 days, then screened through GF/F paper. The filtrate was dried in an oven at 50° C. overnight to yield the title product (23.6 g).

EXAMPLE 2

Preparation of:

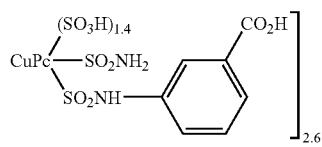

The title product was prepared by the method described in Example 1 except that in Stage II 3-aminobenzoic acid was used in place of 3-sulphoaniline.

EXAMPLE 3

Preparation of:

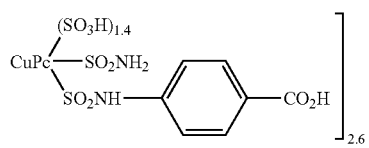

The title product was prepared by the method described in Example 1 except that in Stage II 4-aminobenzoic acid was used in place of 3-sulphoaniline.

EXAMPLE 4

Preparation of:

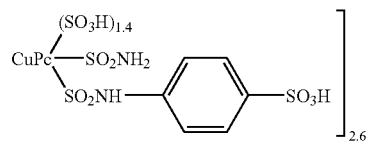

The title product was prepared by the method described in Example 1 except that in Stage II 4-sulphoaniline was used in place of 3-sulphoaniline.

EXAMPLE 5

Preparation of:

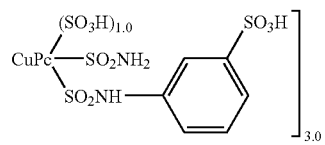

The title product was prepared by the method described in Example 1 except that the amount of $POCl_3$ was increased to 8.7 ml, 0.094 mole.

COMPARATIVE EXAMPLE 1

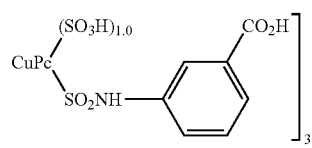

The title compound was prepared by the method described in Example 3 of U.S. Pat. No. 5,296,023 which is incorporated herein by reference thereto.

EXAMPLE 6

Preparation of Inks

Inks were prepared by dissolving 3.5 parts (by weight) of dye in a solution containing 2-pyrrolidone (2.5 parts), thiodiglycol (5 parts), urea (2.5 parts), Surfynol™ 465 (1 part, a surfactant commercially available from Air Products Inc.) and distilled water (84.5 parts) and adjusting to pH 8.5 to 9 using sodium hydroxide. The resultant inks were as follows:

Ink 1 contained compound prepared in Example 1 as the dye;
Ink 2 contained compound prepared in Example 2 as the dye;
Ink 3 contained compound prepared in Example 3 as the dye;
Ink 4 contained compound prepared in Example 4 as the dye;
Ink 5 contained compound prepared in Example 5 as the dye;

Comparative Ink contained the Dye from Comparative Example 1.

Each ink was filtered through a 0.45 µm filter and put into a chamber of a Canon trichamber inkjet cartidge.

"Surfynol" is a registered trade mark of Air Products Inc.

EXAMPLE 7

Ink-jet Printing and Properties of the Printed Image

Inks 1 to 5 and the Comparative Ink were printed onto Epson Premium Photo Glossy Paper using an Epson 880 ink-jet printer.

Colour Properties of the Prints

The colour properties of the image formed with inks 1 to 5 and the Comparative Ink are shown in Table A.

The CIE colour co-ordinates of each print (a, b, L, Chroma and hue) were measured using a X-Rite 983 Spectrodensitometer with 0°/45° measuring geometry with a spectral range of 400–700 nm at 20 nm spectral intervals, using illuminant C with a 2° (CIE 1931) observer angle and a density operation of status T. No less than 4 measurements were taken diagonally across a solid colour block on the print with a size greater than 10 mm×10 mm.

OD is the optical density of the printed paper, as measured by the X-Rite 983 Spectrodensitometer.

TABLE A

| Ink | % Depth | OD | L | a | b | Hue | Chroma |
|---|---|---|---|---|---|---|---|
| Control Ink | 100 | 2.51 | 51 | −51 | 48 | 223 | 69 |
|  | 70 | 0.86 | 72 | −42 | −32 | 218 | 52 |
| Ink 1 | 100 | 2.11 | 44 | −37 | −54 | 236 | 66 |
|  | 70 | 0.95 | 67 | −37 | −39 | 226 | 54 |
| Ink 2 | 100 | 2.17 | 44 | −39 | −53 | 235 | 65 |
|  | 70 | 0.96 | 68 | −39 | −39 | 225 | 55 |
| Ink 3 | 100 | 2.14 | 45 | −38 | −54 | 235 | 66 |
|  | 70 | 0.98 | 67 | −39 | −40 | 226 | 55 |
| Ink 4 | 100 | 2.19 | 44 | −37 | −54 | 235 | 66 |
|  | 70 | 1.01 | 66 | −39 | −40 | 226 | 55 |
| Ink 5 | 100 | 2.1 | 45 | −40 | −52 | 233 | 66 |
|  | 70 | 0.99 | 67 | −39 | −39 | 226 | 55 |

Ozone Fastness

Substrates printed with inks 1 to 5 and the comparative ink were assessed for ozone stability using an ozone test cabinet from Hampden Test Equipment. The test was carried out for two and a half hours at 40° C. and 55% relative humidity in the presence of 400 parts per hundred million of ozone. Fastness of the printed ink to ozone was judged by the difference in the optical density before and after exposure to ozone using an X-Rite 983 Spectrodensitometer. Thus, the lower the % OD loss the greater the ozone fastness.

Results are shown below in Table B. Table B shows these clearly demonstrate the advantage of inks based on dyes of this invention over the ink containing the comparative dye.

TABLE B

| Ink | Ozone Fastness % OD Loss |
|---|---|
| Comparative Ink 100% Depth | 33 |
| Comparative Ink 70% Depth | 42 |
| Ink 1 100% Depth | 0 |
| Ink 1 70% Depth | 18 |
| Ink 2 100% Depth | 2 |
| Ink 2 70% Depth | 20 |
| Ink 3 100% Depth | 1 |
| Ink 3 70% Depth | 19 |
| Ink 4 100% Depth | 0 |
| Ink 4 70% Depth | 12 |
| Ink 5 100% Depth | 0 |
| Ink 5 70% Depth | 16 |

EXAMPLE 8

Further Inks

The inks described in Tables I and II may be prepared wherein the Dye described in the first column is the compound made in the above example of the same number. Numbers quoted in the second column onwards refer to the number of parts of the relevant ingredient and all parts are by weight. The inks may be applied to paper by thermal or piezo ink-jet printing.

The following abbreviations are used in Table I and II:

PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE I

| Dye of Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 |  | 6 | 4 |  |  |  |  | 5 |  |
| 2 | 3.0 | 90 |  | 5 | 5 |  | 0.2 |  |  |  |  |  |
| 3 | 10.0 | 85 | 3 |  | 3 | 3 |  |  |  | 5 | 1 |  |
| 4 | 2.1 | 91 |  | 8 |  |  |  |  |  |  |  | 1 |
| 5 | 3.1 | 86 | 5 |  |  |  |  | 0.2 | 4 |  |  | 5 |
| 1 | 1.1 | 81 |  |  | 9 |  | 0.5 | 0.5 |  |  | 9 |  |
| 2 | 2.5 | 60 | 4 | 15 | 3 | 3 |  |  | 6 | 10 | 5 | 4 |
| 3 | 5 | 65 |  | 20 |  |  |  |  | 10 |  |  |  |
| 4 | 2.4 | 75 | 5 | 4 |  | 5 |  |  |  | 6 |  | 5 |
| 5 | 4.1 | 80 | 3 | 5 | 2 | 10 |  | 0.3 |  |  |  |  |
| 1 | 3.2 | 65 |  | 5 | 4 | 6 |  |  | 5 | 4 | 6 | 5 |
| 2 | 5.1 | 96 |  |  |  |  |  |  |  | 4 |  |  |

TABLE I-continued

| Dye of Example | Dye Content | Water | PG | DEG | NMP | DMK | NaOH | Na Stearate | IPA | MEOH | 2P | MIBK |
|---|---|---|---|---|---|---|---|---|---|---|---|---|
| 3 | 10.8 | 90 | 5 | | | | | | 5 | | | |
| 4 | 10.0 | 80 | 2 | 6 | 2 | 5 | | | 1 | | 4 | |
| 5 | 1.8 | 80 | | 5 | | | | | | | 15 | |
| 1 | 2.6 | 84 | | | 11 | | | | | | 5 | |
| 2 | 3.3 | 80 | 2 | | | 10 | | | | | 2 | 6 |
| 3 | 12.0 | 90 | | | 7 | | 0.3 | 3 | | | | |
| 4 | 5.4 | 69 | 2 | 20 | 2 | 1 | | | | | 3 | 3 |
| 5 | 6.0 | 91 | | | 4 | | | | | | 5 | |

TABLE II

| Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 1 | 0.9 | 85 | | 10 | | | | | 5 | 0.2 | | |
| 2 | 8.0 | 90 | | 5 | 5 | | | 0.3 | | | | |
| 3 | 4.0 | 70 | | 10 | 4 | | | | 1 | | 4 | 11 |
| 4 | 2.2 | 75 | 4 | 10 | 3 | | | | 2 | | 6 | |
| 5 | 10.0 | 91 | | | 6 | | | | | | 3 | |
| 1 | 9.0 | 76 | | 9 | 7 | | 3.0 | | | 0.95 | 5 | |
| 2 | 5.0 | 78 | 5 | 11 | | | | | | | 6 | |
| 3 | 5.4 | 86 | | | 7 | | | | | | 7 | |
| 4 | 2.1 | 70 | 5 | 5 | 5 | 0.1 | 0.2 | 0.1 | 5 | 0.1 | 5 | |
| 5 | 2.0 | 90 | | | 10 | | | | | | | |
| 1 | 2 | 88 | | | | | | 10 | | | | |
| 2 | 5 | 78 | | | 5 | | | 12 | | | 5 | |
| 3 | 8 | 70 | 2 | | 8 | | | 15 | | | 5 | |
| 4 | 10 | 80 | | | | | | 8 | | 12 | | |
| 5 | 10 | 80 | | 10 | | | | | | | | |

The invention claimed is:

1. A process for coloration of a substrate comprising applying thereto by means of an ink-jet printer an ink composition comprising a compound of Formula (1) or salt thereof:

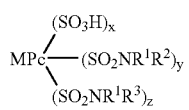

Formula (1)

wherein:
M is 2H, Si, a metal, an oxymetal group, a hydroxymetal group or a halometal group;

Pc is a phthalocyanine nucleus of Formula (2);

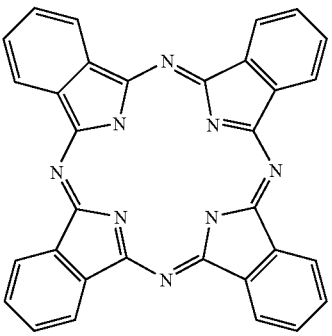

Formula (2)

each $R^1$ and $R^2$ independently are H, $C_{1-4}$alkyl or $C_{1-4}$hydroxyalkyl;

R³ is phenyl carrying 1 or 2 sulpho substituents or phenyl carrying at least 1 carboxy or 1 phosphate substituent and having further optional substituents;

x, y and z are all greater than 0 and the sum of (x+y+z) is 2 to 5.

2. A process according to claim 1 wherein M is Cu or Ni.

3. A process according to either claim 1 or claim 2 wherein R³ is phenyl carrying a single carboxy or sulpho substituent.

4. A process according to claim 1 wherein R³ is 3-carboxy phenyl.

5. A process according to claim 1 wherein the sum of (x+y+z) is 3 to 4.

6. A compound of Formula (1) or salt thereof

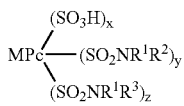

Formula (1)

wherein:

M is 2H, Si, a metal, an oxymetal group, a hydroxymetal group or a halometal group;

Pc is a phthalocyanine nucleus of Formula (2);

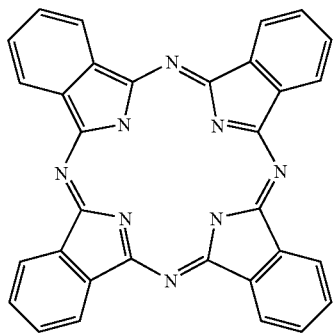

Formula (2)

each R¹ and R² independently are H, $C_{1-4}$alkyl or $C_{1-4}$hydroxyalkyl;

R³ is phenyl carrying 1 or 2 sulpho substituents or phenyl carrying at least 1 carboxy or 1 phosphate substituent and having further optional substituents;

x, y and z are all greater than 0 and the sum of (x+y+z) is 2 to 5, with the proviso that R³ is not of Formula (3), Formula (4) or (5) or a salt thereof:

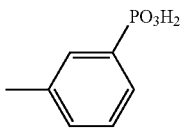

Formula (3)

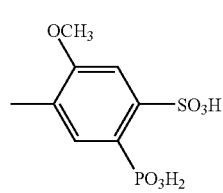

Formula (4)

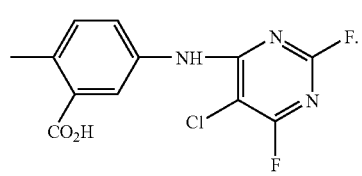

Formula (5)

7. A compound according to claim 6 of Formula (6) or a salt thereof:

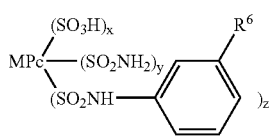

Formula (6)

wherein:

M is 2H, Cu or Ni;

Pc is a phthalocyanine nucleus of Formula (2);

R⁶ is sulpho or carboxy; and x, y and z are all greater than 0 and the sum of (x+y+z) is 2 to 4.

8. A compound of Formula (6) according to claim 7 wherein R⁶ is carboxy.

9. A composition comprising a compound as described in claim 6 and a liquid medium.

10. A substrate printed by means of a process as described in claim 1.

11. An ink-jet printer cartridge comprising a chamber and an ink wherein the ink is in the chamber and the ink is a composition as defined in claim 9.

* * * * *